(No Model.)
W. H. SANDERS.
DEVICE FOR HANDLING, &c., TOMBSTONES AND MONUMENTS.
No. 279,191. Patented June 12, 1883.
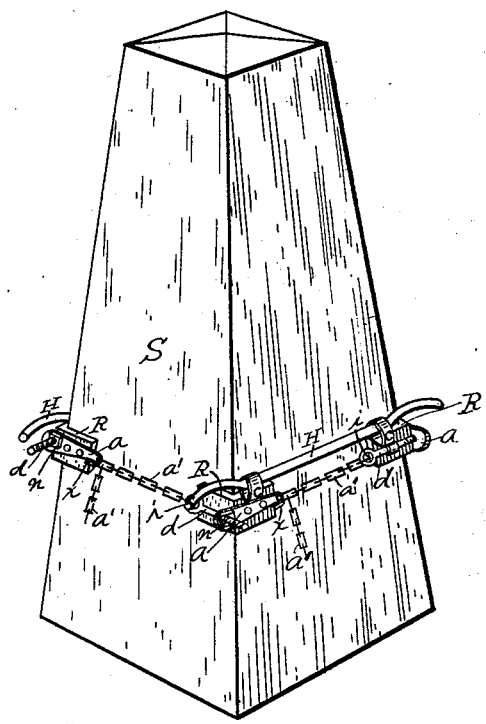
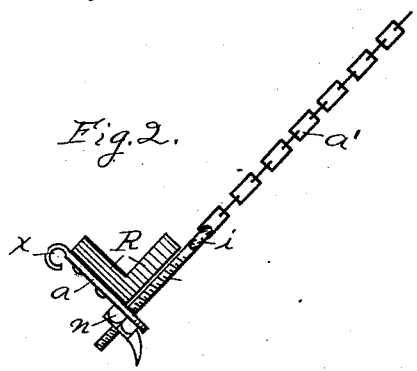
Witnesses.
Geo. J. Munroe
J. O. Simonds
Inventor.
William H. Sanders

UNITED STATES PATENT OFFICE.

WILLIAM H. SANDERS, OF FRANKFORT, ILLINOIS.

DEVICE FOR HANDLING, &c., TOMBSTONES AND MONUMENTS.

SPECIFICATION forming part of Letters Patent No. 279,191, dated June 12, 1883.

Application filed April 20, 1883. (No model.)

*To all whom it may concern:*

Be it known that I, WILLIAM H. SANDERS, of Frankfort, Will county, Illinois, have made a new and useful Improvement in Devices for Handling and Setting up Tombstones and Monuments, of which the following is a specification.

My invention relates to the mechanism by means of which a tombstone or monument is placed in its required position.

Heretofore, so far as I have observed, no mechanism has been used to preserve the corners of monuments or tombstones in setting them up, and their corners are apt to become chipped or disfigured.

The object of my invention is to do away with this evil, and to furnish a device by the help of which a monument or tombstone may be handled with ease and safety.

In the accompanying drawings, which form a part of this specification, Figure 1 represents a perspective view of a monument with my invention thereto attached, and showing the manner of its use; and Fig. 2 is a detached view of my invention.

Like letters of reference made use of in the several figures indicate like parts wherever used.

Referring particularly to said drawings, S represents a monument or object to be moved.

R are rubber plates attached to the corner-plates $a$, said corner-plates $a$ being adapted to receive the rubber plates R, and also the bolt $d$, having the eye $i$ and the nut $u$, for the purpose of tightening or loosening the plates $a$.

$a'$ are chains attached to the corner-plates $a$ by means of the hooks $x$ and the bolt $d$, having the eye $i$.

H are handles attached to the corner-plates $a$ by means of the loops $c$, as shown in Fig. 1. By means of the chain $a'$, the bolt $d$, and the nut $u$, the distance between said corner-plates $a$ may be increased or diminished at pleasure, and thus monuments or tombstones of any size may be shifted by means of said device.

Having thus described my invention, that which I claim, and desire to secure by Letters Patent, is—

1. As a new article of manufacture, the herein-described device for handling and setting up monuments and tombstones, consisting of a corner-plate of metal having a rubber lining, and provided with the hook $x$ and the bolt $d$, with the eye $i$ and the nut $u$, for the purpose of retaining the chain $a'$, in the manner and for the purpose heretofore described.

2. The combination, with the corner-plate $a$, having the rubber plate R thereto attached, of the hook $x$, the bolt $d$, having the eye $i$ and the nut $u$, the chain $a'$, the loops $c$, and the handles H, all in the manner and for the purpose as specified.

WILLIAM H. SANDERS. [L. S.]

Witnesses:
   GEO. J. MUNROE,
   S. O. SIMONDS.